(12) United States Patent
Gangal et al.

(10) Patent No.: US 8,899,658 B1
(45) Date of Patent: Dec. 2, 2014

(54) LIFTGATE HINGE REINFORCEMENT

(71) Applicant: Ford Global Technologies, LLC, Dearborn, MI (US)

(72) Inventors: Maneesh Gangal, Troy, MI (US); Rajinder P. Singh, Plymouth, MI (US); Pinak Dave, Troy, MI (US)

(73) Assignee: Ford Global Technologies, LLC, Daerborn, MI (US)

( * ) Notice: Subject to any disclaimer, the term of this patent is extended or adjusted under 35 U.S.C. 154(b) by 0 days.

(21) Appl. No.: 14/086,104

(22) Filed: Nov. 21, 2013

(51) Int. Cl.
*B60J 5/00* (2006.01)
*B60J 5/10* (2006.01)

(52) U.S. Cl.
CPC .................................. *B60J 5/107* (2013.01)
USPC ............................. 296/146.6; 296/56

(58) Field of Classification Search
USPC ................. 296/146.6, 187.11, 203.04, 56
See application file for complete search history.

(56) References Cited

U.S. PATENT DOCUMENTS

| | | | |
|---|---|---|---|
| 7,004,536 B2 * | 2/2006 | Wieber | 296/210 |
| 7,503,619 B2 * | 3/2009 | Werner | 296/146.8 |
| 7,828,373 B2 * | 11/2010 | Fernholz et al. | 296/191 |
| 8,114,239 B2 * | 2/2012 | Fernholz et al. | 156/272.8 |
| 8,403,399 B2 | 3/2013 | Kuntze et al. | |
| 2007/0170751 A1 * | 7/2007 | Tanaka et al. | 296/146.6 |
| 2008/0030047 A1 * | 2/2008 | Munenaga et al. | 296/146.6 |
| 2011/0074179 A1 * | 3/2011 | Kuntze et al. | 296/146.6 |
| 2012/0248814 A1 | 10/2012 | Tsukiyama et al. | |

FOREIGN PATENT DOCUMENTS

| | | |
|---|---|---|
| JP | 2003237370 | 8/2003 |
| JP | 2012116388 | 7/2012 |
| KR | 20020084727 | 11/2002 |

OTHER PUBLICATIONS

Lotus Engineering Inc., "Evaluating the Structure and Crashworthiness of a 2020 Model-Year, Mass-Reduced Crossover Vehicle Using FEA Modeling", Contract Number: 09-621 (California Air Resources Board (ARB)), Aug. 31, 2012, 226 pages.

* cited by examiner

*Primary Examiner* — Lori L Lyjak
(74) *Attorney, Agent, or Firm* — Jason C. Rogers; Bejin Bieneman PLC

(57) ABSTRACT

A reinforcement assembly for a liftgate system includes vertical and horizontal portions. The horizontal portion includes a protuberant portion that includes a top wall configured to be affixed to an outer panel of the liftgate system, and to form a space with an inner panel of the liftgate system. The vertical portion is configured to be affixed to a vertical portion of an inner panel.

19 Claims, 4 Drawing Sheets

LIFTGATE HINGE REINFORCEMENT

BACKGROUND

A vehicle liftgate may have a hinged connection to a vehicle body. When open, the liftgate may be supported by struts, whether the liftgate is subject to closing manually or under power. Further, various portions of an outer panel of the liftgate may be subject to various loads during operation, such loads causing deflections at various points from a nominal design of the outer panel. However, liftgate loads, and resulting deflections, may exceed established design parameters or goals relating to appearance, and other factors, particularly in that the outer panel of a vehicle liftgate is generally a Class A surface.

DRAWINGS

DETAILED DESCRIPTION

Figure 1:
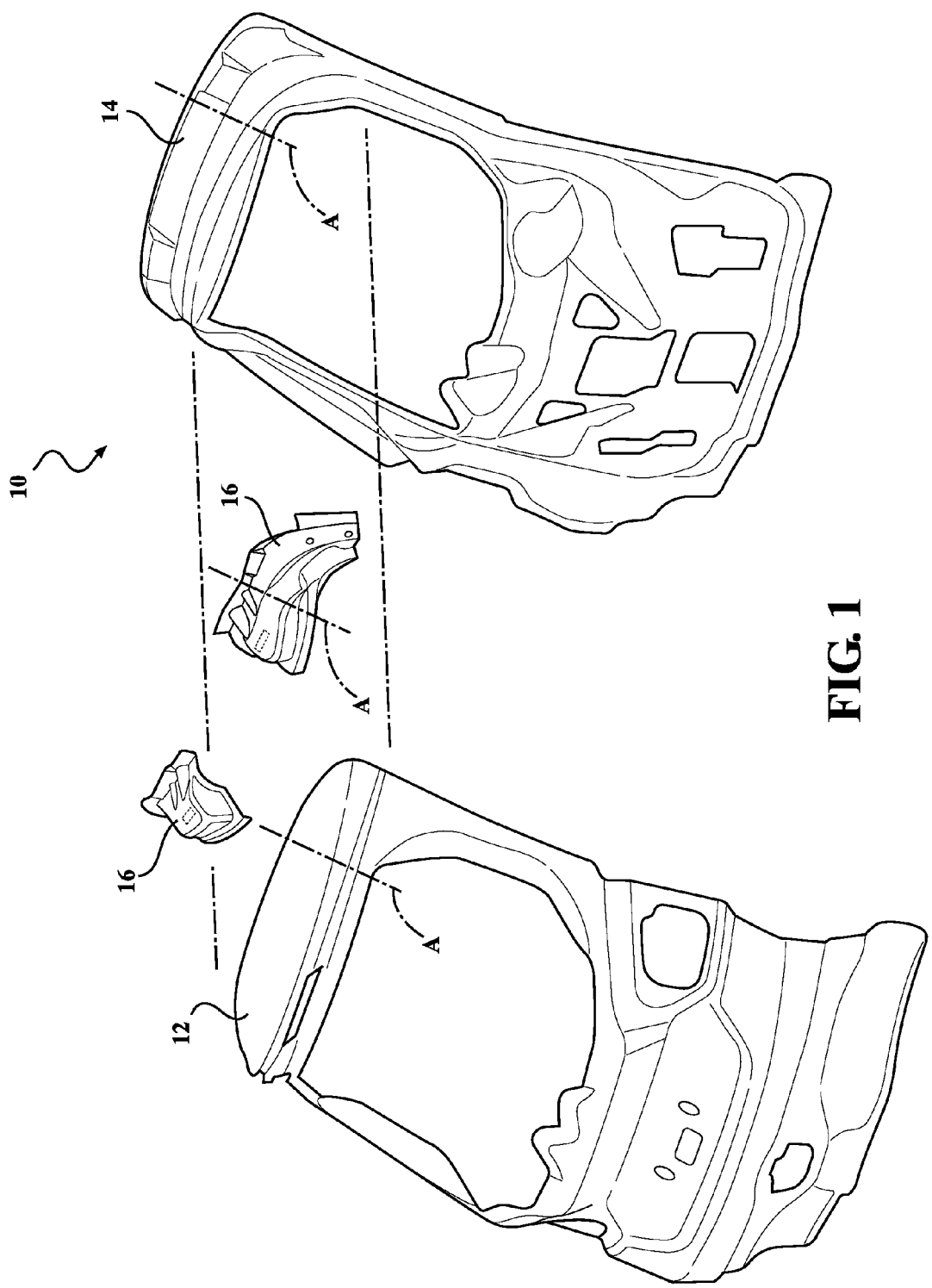
FIG. 1 is a perspective exploded view of an exemplary liftgate system.

FIG. 1 is a perspective exploded view of an exemplary liftgate system 10. An outer panel 12 generally includes a Class A surface such as is known. The outer panel 12 is configured to be mated to an inner panel 14. A pair of reinforcement assemblies 16 are disposed between the outer panel 12 and the inner panel 14. Although not shown in FIG. 1, it will be appreciated that the liftgate system 10 is generally configured for hinged attachment to a vehicle body.

Figure 2:
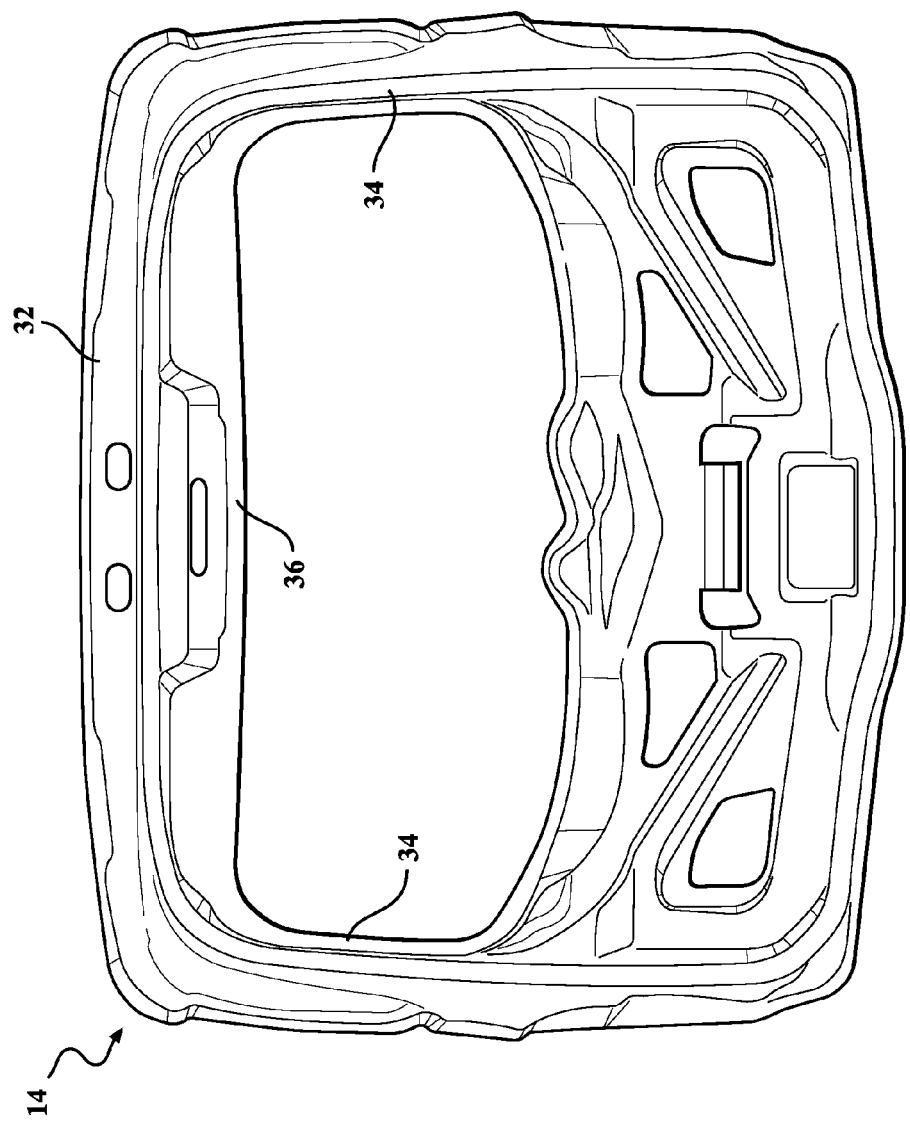
FIG. 2 is a front view of an exemplary liftgate inner panel.

FIG. 2 is a front view of an exemplary liftgate inner panel 14. The inner panel 14 generally includes a horizontal top portion 32, and left and right vertical side portions 34. Further, a ridge 36 generally extends about, or just inside of, a perimeter of the panel 14, or at least throughout the portions 32, 34. For hinged attachment of the liftgate system 10 to a vehicle body, it will be appreciated that the top portion 32 is generally the most proximate portion of the panel 14 to one or more hinged attaching the liftgate system 10 to the vehicle body.

Figure 3:
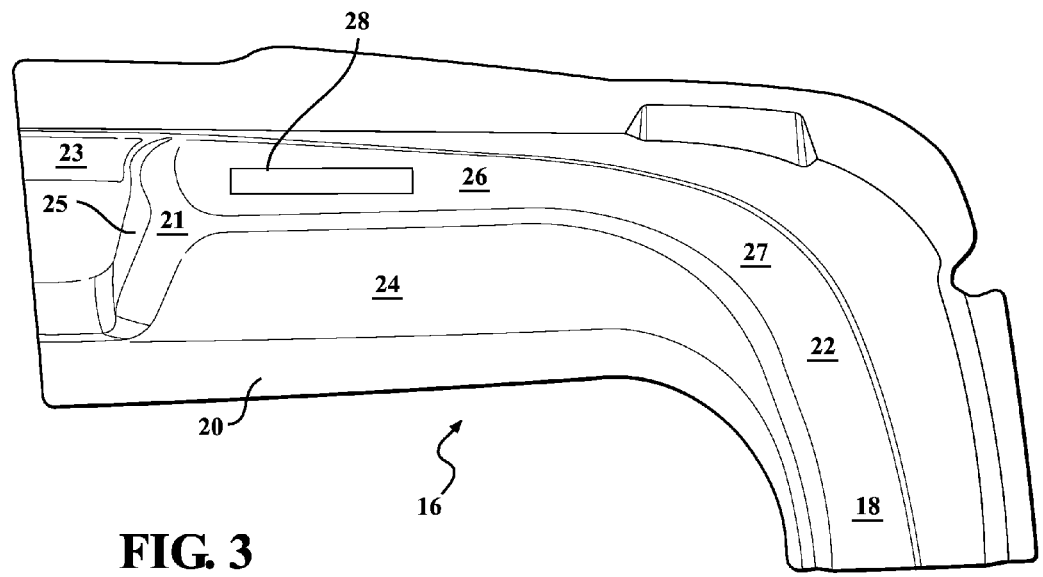
FIG. 3 is a front perspective view of an exemplary reinforcement assembly.
Figure 4:
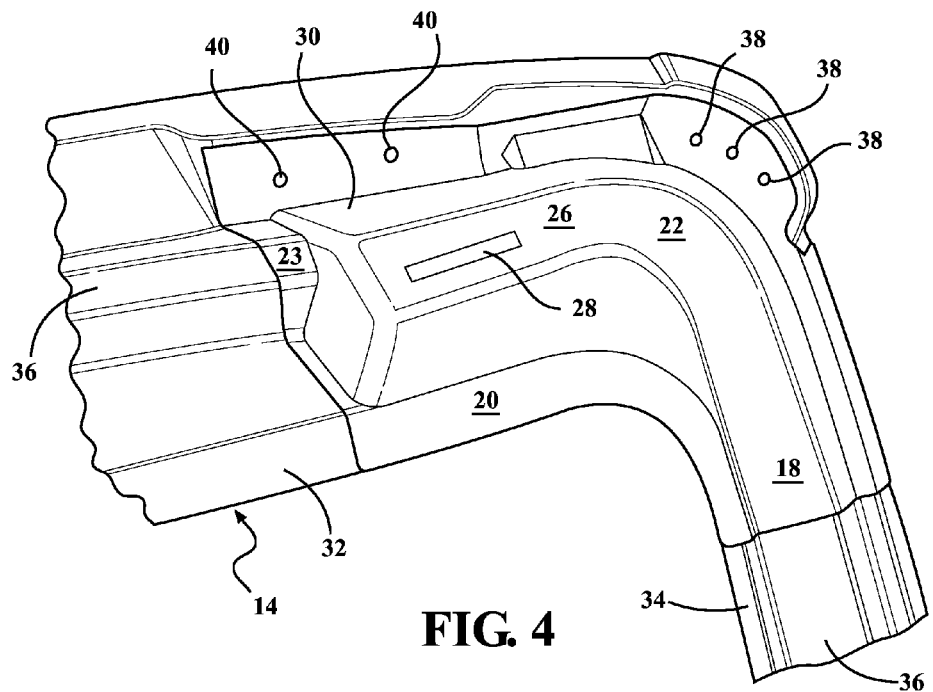
FIG. 4 is a perspective view of an exemplary reinforcement assembly attached to an exemplary liftgate inner panel.
Figure 5:
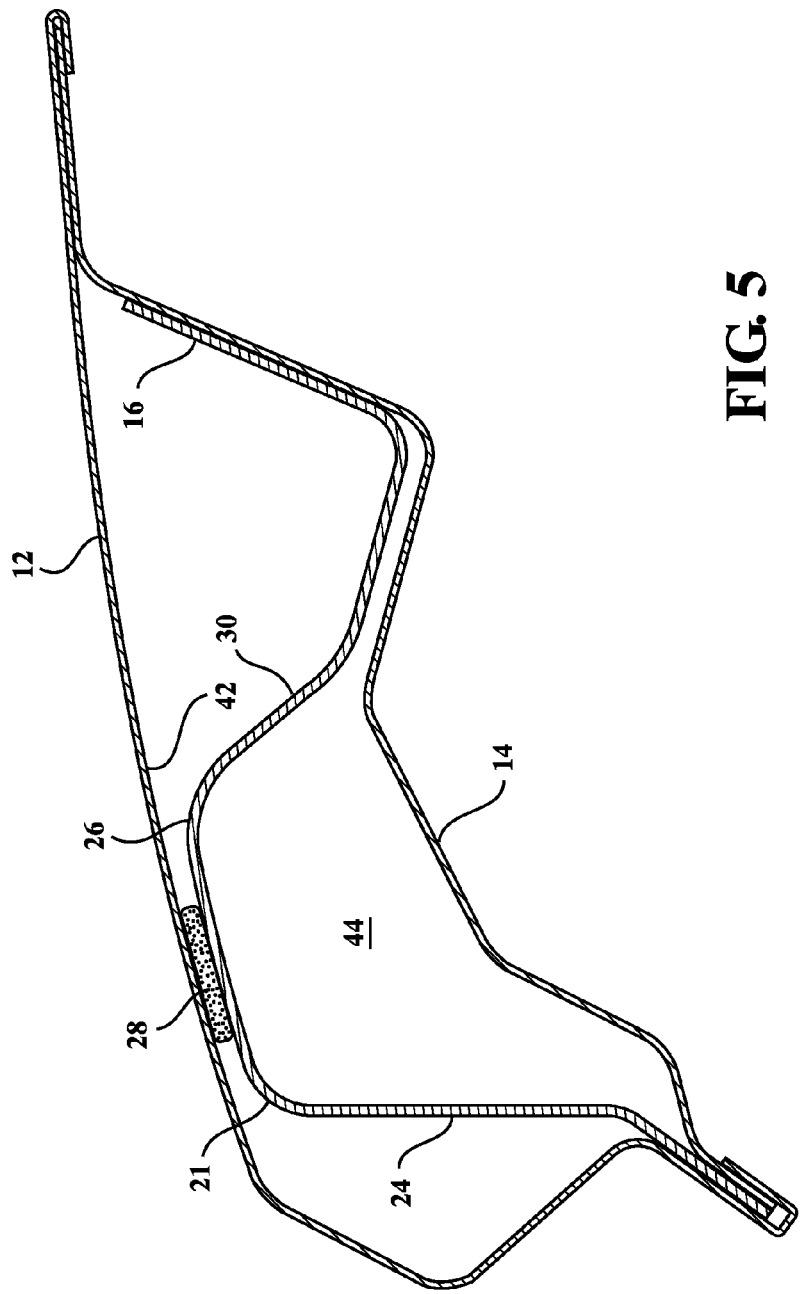
FIG. 5 is a cross-sectional view of an exemplary reinforcement assembly disposed between lift gate inner and outer panels.

FIG. 3 is a front perspective view of an exemplary reinforcement assembly 16. The assembly 16 is roughly L-shaped, and includes a vertical portion 18 and a horizontal portion 20 that meet at a bend 22. The horizontal portion 20 generally has a greater length, e.g., two or three times greater, than the vertical portion 18. The horizontal portion 20 includes a protuberant portion 21 that is generally formed by walls that meet at generally rounded edges and/or corners, including a front wall 24, a top wall 26, first and second end walls 25, 27, and, as seen in FIGS. 4 and 5, a rear wall 30. The protuberant portion 21 is generally elongated such that each of the walls 24, 26, 30 substantially form rectangular or trapezoidal shapes, generally having rounded corners, and have a longer dimension in a horizontal direction than in a vertical direction. Each of the walls 24, 25, 27, and 30 may slope away from the top wall 26 at angles of greater than ninety degrees. An adhesive 28 may be affixed to the top wall 26. The adhesive 28 may be in the form of a structural adhesive patch, such as is known, e.g., that expands and cures when heated in a paint oven or the like.

FIG. 4 is a perspective view of an exemplary reinforcement assembly 16 attached to an exemplary liftgate inner panel 14. The assembly 16 may be attached to the panel 14 by various mechanisms, including rivets (not shown in FIG. 4), welds 38, and/or bolts 40. As can be seen, the assembly 16 is fitted over the ridge 36 of the inner panel 14, and generally in a manner such that the vertical portion 18 of the assembly 16 contacts and is fitted over the vertical portion 34 of the inner panel 14, including the ridge 36. Further, the horizontal portion 20 of the assembly may contact the ridge 36 at a fitted end 23 of the portion 20, the fitted end being shaped to fit over and contact two or more sides of the ridge 36.

However, the horizontal portion 20, and in particular the protuberant portion 21, is configured so that, for a majority of the length of the portion 20 of the assembly 16, i.e., extending from the end 23 to the bend 22, the assembly 16 does not contact the ridge 36 but does generally contact the outer panel 12. As discussed further below, this configuration of the assembly 16 advantageously provides for a sharing of a load from the weight of the liftgate system 10 between the panels 12, 14 in a manner that was not previously possible.

FIG. 5 is a cross-sectional view of an exemplary reinforcement assembly 16 disposed between lift gate inner and outer panels. The axis A in FIG. 1 illustrates a possible location of the illustrated cross-section of assembly 16 in the liftgate system 10. The reinforcement assembly 16 may be affixed to the inner panel 14 by mechanisms such as discussed above, and further may be affixed to an inner surface 42 of the outer panel 12 at the top wall 26 by the adhesive 28. Alternatively or additionally to the adhesive 28, the assembly 16 may be affixed to the outer panel 12 via other mechanisms, e.g., conventional welds, laser welds, and/or rivets. The protuberant portion 21 of the assembly 16 forms a space 44 between the assembly 16 and the inner panel 14.

By configuring the assembly 16 so that the top wall 26 of the assembly 16 receives a load from the outer panel 12, and so that the space 44 is formed between the assembly 16 and the inner panel 14, the load on the liftgate system 10 is advantageously distributed or shared between the various portions and areas of the panels 12, 14 so as to achieve a closer fit to intended design parameters than was previously possible. Achieving as close of a fit as possible to intended design parameters is an important goal.

In fact, experimentation with models of the disclosed liftgate system 10 confirms the advantages of this arrangement, and that the present design more closely achieves a fit with intended design parameters than previous designs. For example, the assembly 16 for reinforcing a hinged liftgate system 10 has been found to result in various deflections from a nominal design at various points in an outer panel 12. These empirically determined deflections are, unexpectedly, significantly lower than deflections experienced with prior and other liftgate systems. Accordingly, the disclosed liftgate system 10 better meets safety, appearance, and/or other design requirements associated with supporting loads on a liftgate system 10, including on an outer panel 12 including a Class A surface.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A reinforcement assembly for a liftgate system, comprising:
   vertical and horizontal portions; and
   a protuberant portion in the horizontal portion, the protuberant portion including a top wall configured to be affixed to an outer panel of the liftgate system, and to form a space with an inner panel of the liftgate system;
   wherein the vertical portion is configured to be affixed to a vertical portion of an inner panel.

2. The assembly of claim 1, further comprising an adhesive patch for fixing the top wall to the outer panel.

3. The assembly of claim 1, further comprising a fitted end of the horizontal portion, the fitted end configured to contact at least two sides of a ridge of the inner panel.

4. The assembly of claim 1, configured to be attached to the inner panel by at least one of a weld and a bolt.

5. The assembly of claim 1, wherein the horizontal portion has a length greater than the vertical portion.

6. The assembly of claim 1, further comprising a fitted end that is configured to be fitted over and attached to a ridge formed in a horizontal top portion of the inner panel.

7. The assembly of claim 1, wherein:
   the inner panel is configured to be mated to an outer panel;
   the protuberant portion is formed at least by the top wall, a front wall, a back wall, and first and second end walls; and
   the assembly is configured such that the top wall contacts the outer panel, and none of the front wall, back wall, and first and second walls, contact the outer panel, when the inner panel and the outer panel are in a mated position.

8. The assembly of claim 1, wherein the outer panel includes a Class A surface.

9. A liftgate system, comprising:
   an outer panel;
   an inner panel, wherein the outer panel and the inner panel are configured to be mated to one another; and
   a reinforcement assembly that is configured to be disposed between the outer panel and the inner panel when the outer panel and the inner panel are mated, and that includes:
   vertical and horizontal portions; and
   a protuberant portion in the horizontal portion, the protuberant portion including a top wall configured to be affixed to the outer panel, and to form a space with the inner panel;
   wherein the vertical portion is configured to be affixed to a vertical portion of an inner panel.

10. The system of claim 9, wherein the inner panel includes a horizontal top portion that is a most proximate portion of the inner panel to a hinge when the liftgate system is attached to a vehicle with the hinge.

11. The system of claim 9, further comprising a second reinforcement assembly that is configured to be disposed between the outer panel and the inner panel when the outer panel and the inner panel are mated, and that includes:
   vertical and horizontal portions; and
   a protuberant portion in the horizontal portion, the protuberant portion including a top wall configured to be affixed to the outer panel, and to form a space with the inner panel;
   wherein the vertical portion is configured to be affixed to a vertical portion of an inner panel.

12. The system of claim 9, the reinforcement assembly further comprising an adhesive patch for fixing the top wall to the outer panel.

13. The system of claim 9, the reinforcement assembly further comprising a fitted end of the horizontal portion, the fitted end configured to contact at least two sides of a ridge of the inner panel.

14. The system of claim 9, the reinforcement assembly further configured to be attached to the inner panel by at least one of a weld and a bolt.

15. The system of claim 9, wherein the horizontal portion of the reinforcement assembly has a length greater than the vertical portion.

16. The system of claim 9, the reinforcement assembly further comprising a fitted end that is configured to be fitted over and attached to a ridge formed in a horizontal top portion of the inner panel.

17. The system of claim 16, wherein a load is transferred from the horizontal top portion to a vertical portion of the inner panel when the outer panel and the inner panel are mated, and the liftgate system is in an open position when connected to a vehicle by a hinge.

18. The system of claim 9, wherein:
   the protuberant portion of the reinforcement assembly is formed at least by the top wall, a front wall, a back wall, and first and second end walls; and
   the assembly is configured such that the top wall contacts the outer panel, and none of the front wall, back wall, and first and second walls, contact the outer panel, when the inner panel and the outer panel are in a mated position.

19. The system of claim 9, wherein the outer panel includes a Class A surface.

* * * * *